(12) United States Patent
Soderquist et al.

(10) Patent No.: US 7,478,826 B2
(45) Date of Patent: Jan. 20, 2009

(54) AIRBAG MODULE FLAPS

(75) Inventors: Quin Soderquist, South Weber, UT (US); Yutaka Tsuchida, Kasumigaura (JP); Kelly Johnson, Farmington, UT (US)

(73) Assignee: Autoliv ASP, Inc., Ogden, UT (US)

( * ) Notice: Subject to any disclaimer, the term of this patent is extended or adjusted under 35 U.S.C. 154(b) by 371 days.

(21) Appl. No.: 11/335,289

(22) Filed: Jan. 19, 2006

(65) Prior Publication Data
US 2007/0164541 A1    Jul. 19, 2007

(51) Int. Cl.
*B60R 21/16* (2006.01)
(52) U.S. Cl. .................................. 280/728.2
(58) Field of Classification Search ............. 280/730.2, 280/728.2, 743.1
See application file for complete search history.

(56) References Cited

U.S. PATENT DOCUMENTS 7,097,200 B2 * 8/2006 Wold ..................... 280/730.2
7,125,037 B2 * 10/2006 Tallerico et al. .......... 280/728.2

FOREIGN PATENT DOCUMENTS

JP      2000-153744      11/1998

* cited by examiner

*Primary Examiner*—Faye M. Fleming
(74) *Attorney, Agent, or Firm*—Sally J. Brown; Stoel Rives, LLP

(57) ABSTRACT

Disclosed are embodiments of an airbag cushion and related airbag modules including a plurality of flaps that may be used to secure the airbag within a module housing. In one embodiment of the invention, first and second flaps are connected with the airbag cushion. The airbag cushion is adapted to be condensed into a compact configuration wherein the first flap extends adjacent to the second flap and in at least approximately the opposite direction as the second flap.

40 Claims, 5 Drawing Sheets

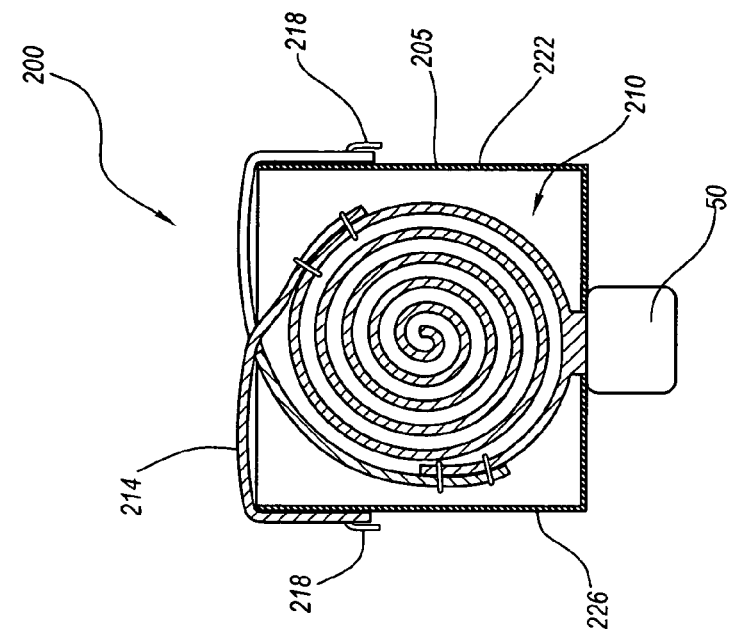
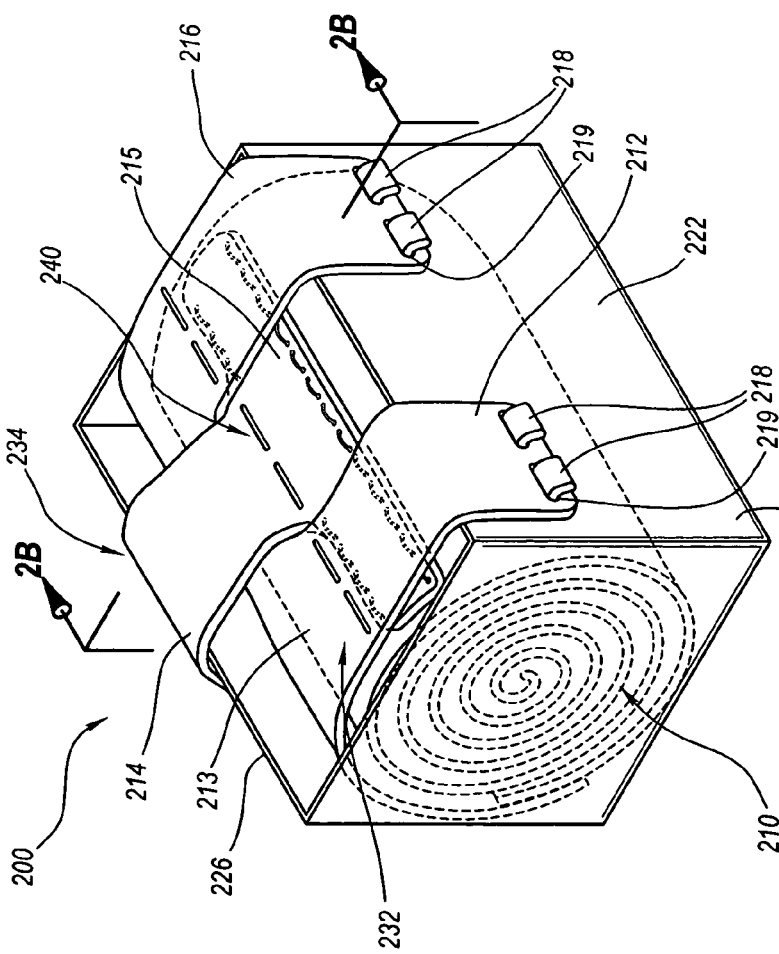
Fig. 2B
Fig. 2A

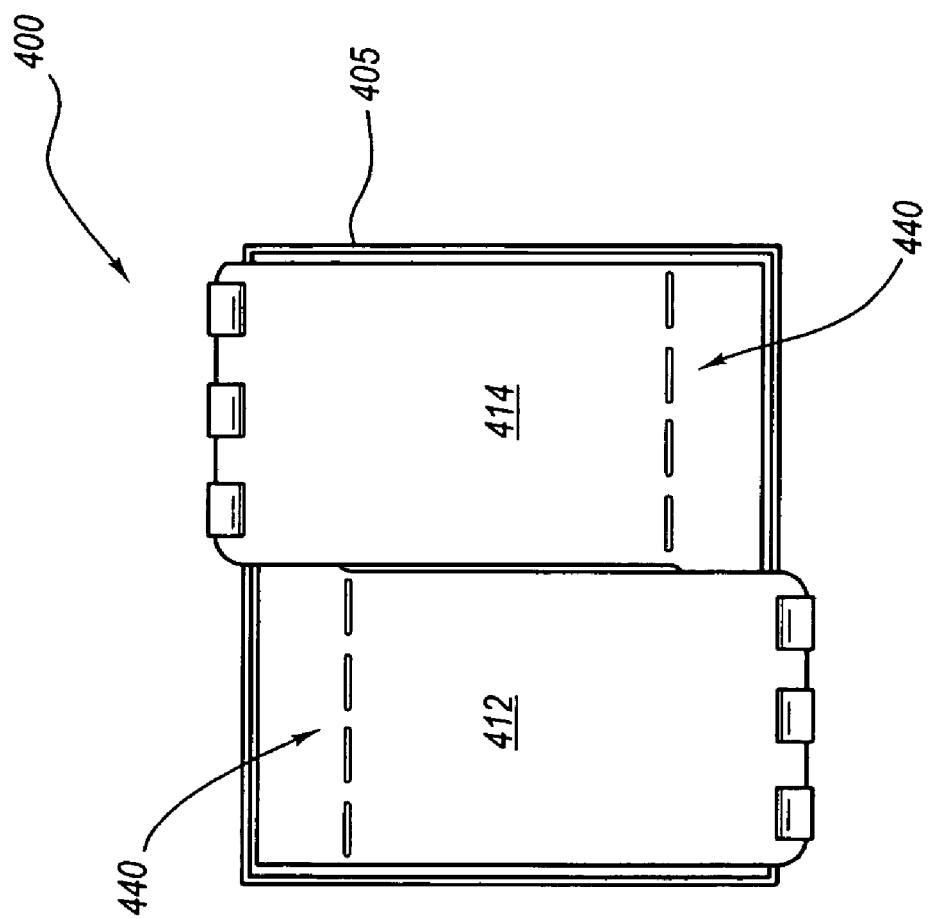

AIRBAG MODULE FLAPS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are therefore not to be considered limiting of its scope, the invention will be described and explained with additional specificity and detail through the use of the accompanying drawings in which:

FIG. 2A is a perspective view of another embodiment of an airbag module.

FIG. 2B is a cross-sectional view taken along line 2B-2B in FIG. 2A.

FIG. 4 is a top plan view of yet another embodiment of an airbag module.

DETAILED DESCRIPTION OF PREFERRED EMBODIMENTS

Figure 1:
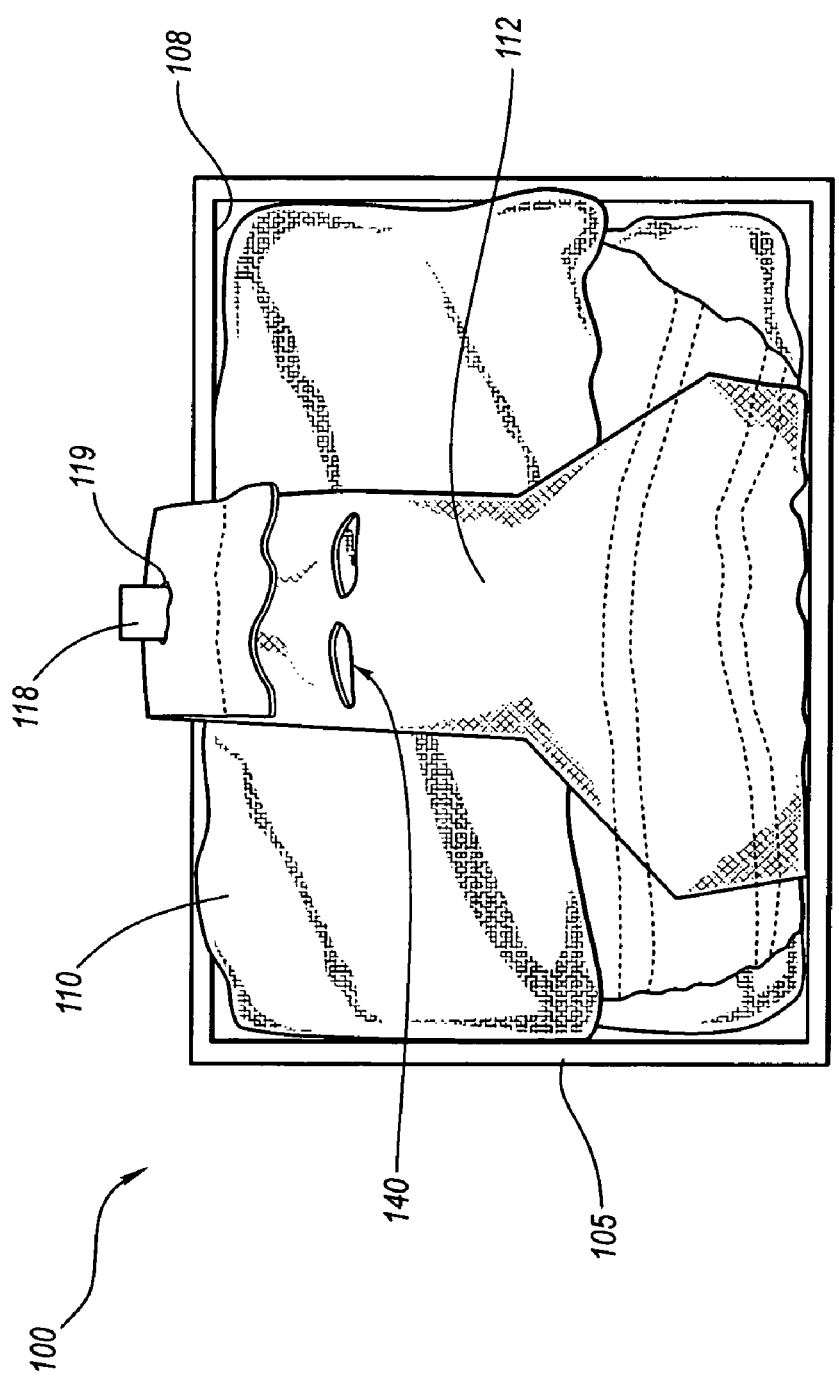
FIG. 1 is a top plan view of an embodiment of an airbag module.

Described below are embodiments of an airbag cushion and related airbag modules including a plurality of flaps that may be used to secure the airbag within a module housing. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, or characteristics may be combined in any suitable manner in one or more embodiments.

In one embodiment of the invention, first and second flaps are connected with the airbag cushion. The airbag cushion is adapted to be condensed into a compact configuration wherein the first flap extends adjacent to the second flap and in at least approximately the opposite direction as the second flap. This allows for such an airbag cushion to be placed within an airbag module housing and secured at a desired location within the housing by connecting the flaps to the housing. Because the flaps extend in opposite directions, they may be attached to opposite portions, such as opposite sides, of the housing.

In other embodiments, more than two flaps may be connected with the airbag cushion. In embodiments with a plurality of flaps, the flaps may be positioned adjacent to one another and may alternate between flaps that extend in one direction and flaps that extend in an opposite direction. For example, in an embodiment having three such flaps, two flaps may extend in one direction and be connected with a module housing on one side of the housing, whereas a flap positioned in between these two flaps may extend in an opposite direction and be connected with the module housing on the opposite side of the housing.

In still other embodiments, only a single flap may be used. In such embodiments, the flap may be attached to the airbag cushion and connected with the airbag module housing. The single flap may be positioned and configured to secure the airbag cushion in a desired position/location. For example, the flap may be positioned and configured to secure the airbag cushion in a compact configuration within the airbag module housing and against an interior surface of the airbag module housing. Of course, other embodiments are contemplated in which a plurality of flaps extend in the same or approximately the same direction and are each connected with a module housing on the same side of the housing.

The aforementioned flaps may be used to facilitate maintenance of the compacted airbag cushion in a desirable position within the module housing. The straps may be used to supplement an existing flap on an airbag cushion or, alternatively, may replace an existing flap or be added to an airbag cushion without a flap.

With reference now to the accompanying figures, embodiments of the invention will now be described in greater detail. FIG. 1 depicts an airbag module 100 including an airbag cushion 110 positioned in an airbag module housing 105. Airbag cushion 110 is condensed into a compact configuration within airbag module housing 105. Airbag cushion 110 has a flap 112 attached to the airbag cushion 110, which is also connected with the airbag module housing 105. Flap 112 is positioned and configured to secure the airbag cushion 110 in its compact configuration and against an interior surface 108 of the airbag module housing 105.

Airbag module housing 105 has a hook 118 extending therefrom. Flap 112 has an opening 119 formed therein, which is sized and configured such that hook 118 may fit through the flap opening 119 to thereby restrain the airbag cushion 110 within the airbag module housing 105. Flap 112 also has one or more holes 140 formed therein, which are configured to tear upon deployment of the airbag, thereby releasing flap 112 from its connection with airbag module housing 105.

FIGS. 2A and 2B depict another embodiment of an airbag module 200 including an airbag cushion 210 positioned in an airbag module housing 205. Airbag cushion 210 is condensed into a compact configuration within airbag module housing 205. More specifically, airbag cushion 210 has been rolled into a rolled configuration within airbag module housing 205. Airbag cushion is positioned to be inflated by inflator 50, as shown in FIG. 2B.

Airbag cushion 210 has three flaps connected therewith. A first flap 212 is connected with the airbag cushion 210 at one end and is connected with the airbag module housing 205 at the other end. Likewise, second flap 214 and third flap 216 are each connected with the airbag cushion 210 at one end and connected with the airbag module housing 205 at the other end. In this embodiment, each of the respective flaps are adapted to be connected with the airbag module housing via a plurality of hooks 218 positioned on the airbag module housing 205. Flaps 212, 214, and 216 each have openings 219 formed therein, which are sized and configured such that hooks 218 may fit through the flap openings 219 to thereby restrain the airbag cushion 210 within the airbag module housing 205.

Each of the flaps 212, 214, and 216, respectively, extend adjacent to one another in alternating opposite directions. In other words, the first flap 212 extends adjacent to the second flap 214 and in the opposite direction as the second flap 214.

Similarly, the third flap 216 extends adjacent to the second flap 214 and in the opposite direction as the second flap 214, such that the second flap 214 is sandwiched between the first and third flaps, 212 and 216, respectively.

The first flap 212 and the third flap 216 are connected with the airbag module housing 205 at an opposite portion of the airbag module housing 205 with respect to the second flap 214. More specifically, flaps 212 and 216 are connected with side 222 of airbag module housing 205, whereas flap 214 is connected with side 226 of airbag module housing 205.

Figure 2C:
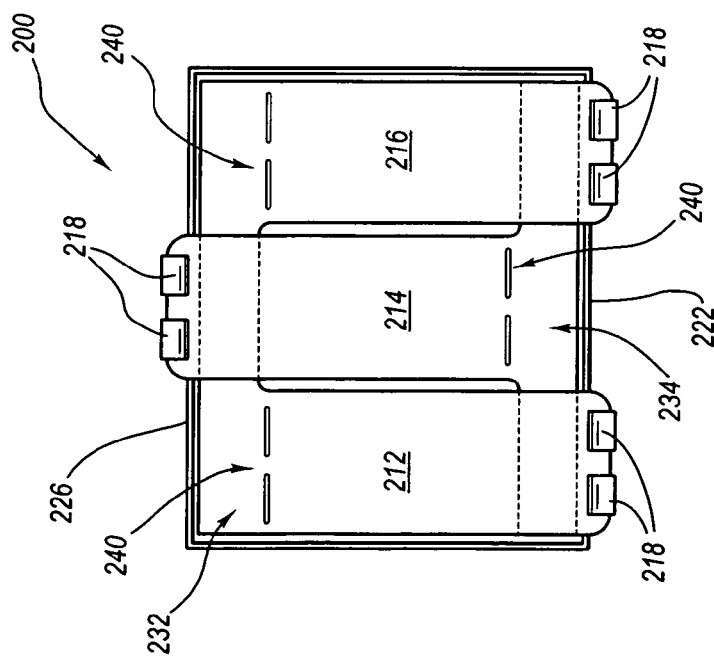
FIG. 2C is a top plan view of the airbag module of FIGS. 2A and 2B.

Flaps 212 and 216 are integrally connected with one another along a base portion 213 such that the first flap 212, base portion 213, and third flap 216 together form a U-shaped member 232. Second flap 214 is also integrally connected with a base portion 215, such that the second flap 214 and the second flap base portion 215 together form a T-shaped member 234. As can be seen in FIGS. 2A and 2C, the T-shaped member 234 and the U-shaped member 232 overlap. In particular, second flap 214 overlaps base portion 213 and flaps 212 and 216 overlap second flap base portion 215.

At the end of U-shaped member 232 and T-shaped member 234 opposite from the ends connected with the airbag module housing 205, base portions 213 and 215 are sewn to airbag cushion 210, as best seen in FIG. 2B. However, a variety of other attachment or other connection methods and/or structures may be used, such as adhesives, welding, staples, or any other methodology and/or structure known or hereafter developed. The overlapping members 232 and 234 in the embodiment of FIGS. 2A-2C are sewn to the airbag cushion 210 at existing seam locations on the airbag cushion. In other words, they are attached along portions at which the airbag cushion has already been sewn. This allows for the flaps to be attached without requiring additional reinforcements. It is intended that the term "seam locations" encompasses a reinforced portion, even if the reinforced portion does not contain seams used to attach two portions of the airbag cushion together.

It should be understood, however, that embodiments are contemplated in which base members are not used. In other words, the flaps may be attached directly to the airbag cushion individually, in which case there would be no overlap as described above in connection with the embodiment having flaps formed with bases so as to form U-shaped and T-shaped members. In such embodiments, the flaps may be sewn or otherwise attached directly to the airbag cushion at existing seam locations on the airbag cushion if desired.

Each of the respective flaps also include tear seams 240. Tear seams 240 are designed to break away or be torn upon inflation of the airbag cushion 210. As best seen in FIG. 2C, tear seam 240 in flap 214 is positioned at the end of flap 214 that merges into second flap base portion 215. Likewise, tear seams 240 in flaps 212 and 216 are positioned at their respective ends at which they merge into base portion 213. However, this need not be the case. Those having skill in the art will appreciate that the tear seams may be positioned at a variety of locations on the flaps and/or base portions.

Still other embodiments need not include tear seams at all. Instead, the flaps may be releasably connected with the airbag module housing. This may be accomplished by, for example, providing a hook-and-loop fastener material, such as Velcro, on the flaps and airbag module housing. Alternatively, in embodiments having slit openings formed therein, such as slit openings 219, which are sized and configured to receive hooks or other such structures therethrough, the openings could be configured to tear upon deployment of the airbag, so as to release the connection between the airbag cushion and the airbag module housing. This could also be accomplished by providing a releasable connection with snaps, adhesives, or other similar structures.

The aforementioned tear seams and hook-and-loop fastener material are both examples of means for releasing the connection between an airbag cushion and an airbag module housing upon inflation of the airbag cushion. Means for releasing the connection between an airbag cushion and an airbag module housing upon inflation of the airbag cushion can comprise either means for releasing the connection between the airbag cushion and the aforementioned flaps, or it can comprise means for releasing the connection between the flaps and the airbag module housing. The tear seams are an example of means for releasing the connection between the airbag cushion and the flaps, whereas the hook-and-loop fastener material, snaps, adhesives, tear-away slit openings, and the like are each examples of means for releasing the connection between the flaps and the airbag module housing.

Figure 3:
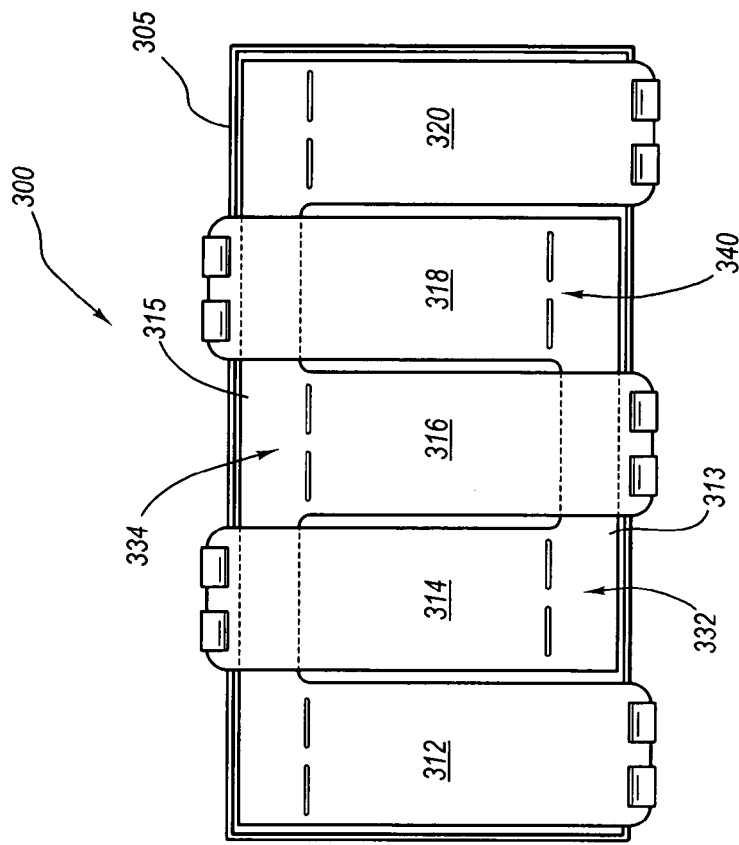
FIG. 3 is a top plan view of still another embodiment of an airbag module.

Another embodiment of the invention is shown in the top plan view of FIG. 3. Airbag module 300 has five flaps, each of which is attached to an airbag cushion (not shown) at one end and to an airbag module housing 305 at the other end. Each of the flaps are sandwiched adjacent to one another such that the second flap 314 is sandwiched between first flap 312 and third flap 316 and the fourth flap 318 is sandwiched between the third flap 316 and fifth flap 320. Also, the second and fourth flaps, 314 and 318, respectively, are connected with the airbag module housing 305 at an opposite side of the airbag module housing 305 with respect to the first, third, and fifth flaps, 312, 316, and 320, respectively.

Flaps 314 and 318 are integrally connected with a base portion 313 so as to form a U-shaped member 332. Flaps 312, 316, and 320 are each integrally connected with a base portion 315 so as to form an M- (or W) shaped member 334. Flaps 314 and 318 overlap with base portion 315 and flaps 312, 316, and 320 overlap with base portion 313. Of course, as previously mentioned, other embodiments are contemplated in which the base portions need not be included. In such embodiments, the various flaps can be attached directly to the airbag cushion and may extend in alternating directions as with the embodiments shown in FIGS. 4 and 5. Each of the respective flaps also include tear seams 340, which are designed to break away or be torn upon inflation of the airbag cushion (not shown).

Still another embodiment of the invention is shown in the top plan view of FIG. 4. Airbag module 400 has two flaps—flap 412 and flap 414, both of which are attached to an airbag cushion (not shown) at one end and to an airbag module housing 405 at the other end. Flap 412 and flap 414 are each attached directly to the airbag cushion, without a base as provided in other embodiments described above. First flap 412 extends adjacent to second flap 414 and in the opposite direction as second flap 414. First flap 412 is therefore connected with airbag module housing 405 at one side of airbag module housing 405 and second flap 414 is connected with airbag module housing 405 at an opposite side of airbag module housing 405. Flaps 412 and 414 also include tear seams 440, which allow for the connection between the flaps and the airbag module housing 405 to be released upon deployment of the airbag cushion.

Figure 5:
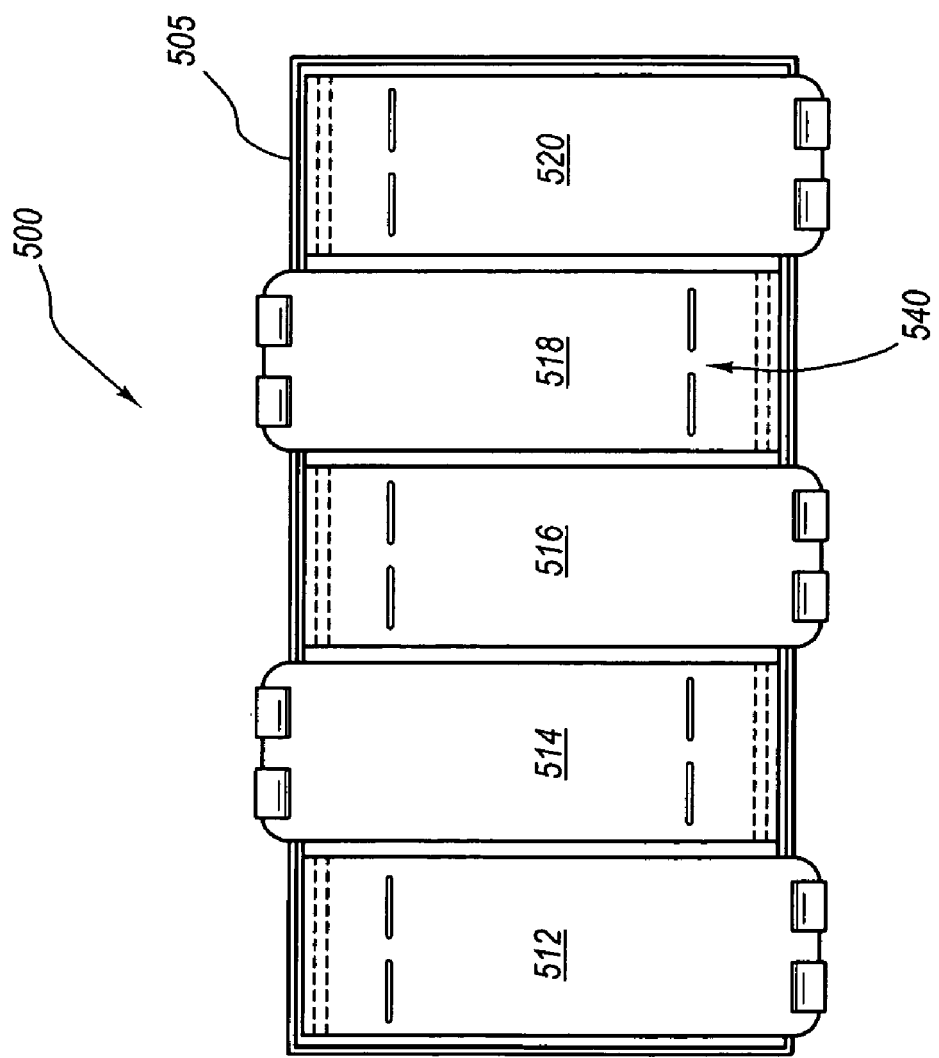
FIG. 5 is a top plan view of still another embodiment of an airbag module.

Yet another embodiment of the invention is shown in the top plan view of FIG. 5. Airbag module 500 is similar to airbag module 300 shown in FIG. 3, but each of the flaps—flaps 512, 514, 516, 518, and 520—are separate pieces of material attached directly to the airbag cushion at one end and connected with the airbag module housing 505 at their respective opposite ends. As can be seen in the figure, flaps 512, 514, 516, 518, and 520 each include tear seams 540 to facilitate releasing the airbag cushion from the module housing upon deployment.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims. Note also that elements recited in means-plus-function format are intended to be construed in accordance with 35 U.S.C. § 112¶6.

The invention claimed is:

1. An airbag cushion construction, comprising:
   an airbag cushion;
   a first flap connected with the airbag cushion, wherein the first flap comprises fabric material; and
   a second flap connected with the airbag cushion, wherein the second flap comprises fabric material, and wherein the airbag cushion is configured to be condensed into a compact configuration, and wherein in the compact configuration the first flap extends adjacent to the second flap and in at least approximately the opposite direction as the second flap.

2. The airbag cushion construction of claim 1, further comprising a third flap connected with the airbag cushion.

3. The airbag cushion construction of claim 2, wherein in the compact configuration the third flap extends adjacent to the second flap and in at least approximately the opposite direction as the second flap such that the second flap is sandwiched between the first and third flaps.

4. The airbag cushion construction of claim 3, wherein the first and third flaps are integrally connected with one another along a base portion such that the first flap, base portion, and third flap together form a U-shaped member.

5. The airbag cushion construction of claim 4, wherein the second flap is integrally connected with a base portion such that the second flap and the second flap base portion together form a T-shaped member, and wherein the T-shaped member and the U-shaped member overlap in the compact configuration.

6. The airbag cushion construction of claim 2, further comprising:
   a fourth flap connected with the airbag cushion; and
   a fifth flap connected with the airbag cushion, wherein in the compact configuration each of the flaps are sandwiched adjacent to one another such that the second flap is sandwiched between the first and third flaps and the fourth flap is sandwiched between the third and fifth flaps, and such that the second and fourth flaps extend in at least approximately the opposite direction as the first, third, and fifth flaps.

7. The airbag cushion construction of claim 1, wherein the compact configuration comprises a rolled configuration.

8. The airbag cushion construction of claim 1, wherein the flaps are sewn to the airbag cushion.

9. The airbag cushion construction of claim 1, wherein the flaps are connected with the airbag cushion at existing seam locations on the airbag cushion.

10. The airbag cushion construction of claim 9, wherein the flaps are sewn to the airbag cushion along existing seams on the airbag cushion.

11. The airbag cushion construction of claim 1, wherein the first and second flaps each comprise tear seams designed to be torn upon inflation of the airbag cushion.

12. An airbag module, comprising:
    an airbag module housing;
    an airbag cushion condensed into a compact configuration within the airbag module housing;
    a first flap connected with the airbag cushion and connected with the airbag module housing; and
    a second flap connected with the airbag cushion and connected with the airbag module housing, wherein the first flap extends adjacent to the second flap and in at least approximately the opposite direction as the second flap such that the first and second flaps are connected with the airbag module housing at opposite portions of the airbag module housing, wherein each of the first and second flaps is configured to move relative to the housing to permit the airbag cushion to transition from the compact configuration to a deployed configuration.

13. The airbag module of claim 12, further comprising a plurality of hooks positioned on the airbag module housing, wherein the first and second flaps each comprise at least one opening, and wherein the plurality of hooks fit through the flap openings to thereby restrain the airbag cushion within the airbag module housing.

14. The airbag module of claim 12, wherein the first and second flaps each comprise tear seams designed to be torn upon inflation of the airbag cushion.

15. The airbag module of claim 12, wherein the first and second flaps are each releasably connected with the airbag module housing.

16. The airbag module of claim 15, wherein the first and second flaps are releasably connected with the airbag module housing by way of a hook-and-loop fastener material.

17. The airbag module of claim 12, further comprising a third flap connected with the airbag cushion and connected with the airbag module housing.

18. The airbag module of claim 17, wherein the third flap extends adjacent to the second flap and in at least approximately the opposite direction as the second flap such that the second flap is sandwiched between the first and third flaps, and such that the second and third flaps are connected with the airbag module housing at opposite portions of the airbag module housing.

19. The airbag module of claim 18, wherein the first and third flaps are integrally connected with one another along a base portion such that the first flap, base portion, and third flap together form a U-shaped member.

20. The airbag module of claim 19, wherein the second flap is integrally connected with a base portion such that the second flap and the second flap base portion together form a T-shaped member, and wherein the T-shaped member and the U-shaped member overlap.

21. The airbag module of claim 17, further comprising:
    a fourth flap connected with the airbag cushion and connected with the airbag module housing; and
    a fifth flap connected with the airbag cushion and connected with the airbag module housing, wherein each of the flaps are sandwiched adjacent to one another such that the second flap is sandwiched between the first and third flaps and the fourth flap is sandwiched between the third and fifth flaps, and such that the second and fourth flaps are connected with the airbag module housing at an opposite portion of the airbag module housing with respect to the first, third, and fifth flaps.

22. The airbag module of claim 12, wherein the compact configuration comprises a rolled configuration.

23. The airbag module of claim 12, wherein the flaps are sewn to the airbag cushion.

24. The airbag module of claim 12, wherein the flaps are connected with the airbag cushion at existing seam locations on the airbag cushion.

25. The airbag module of claim 24, wherein the flaps are sewn to the airbag cushion along existing seams on the airbag cushion.

26. An airbag module, comprising:
   an airbag module housing;
   an airbag cushion condensed into a compact configuration within the airbag module housing;
   a first flap connected with the airbag cushion and connected with the airbag module housing;
   a second flap connected with the airbag cushion and connected with the airbag module housing, wherein the first flap extends adjacent to the second flap and in at least approximately the opposite direction as the second flap such that the first and second flaps are connected with the airbag module housing at opposite portions of the airbag module housing; and
   means for releasing the connection between the airbag cushion and the airbag module housing upon inflation of the airbag cushion.

27. The airbag module of claim 26, wherein the means for releasing the connection between the airbag cushion and the airbag module housing comprises means for releasing the connection between the airbag cushion and the flaps.

28. The airbag module of claim 27, wherein the means for releasing the connection between the airbag cushion and the flaps comprise tear seams designed to be torn upon inflation of the airbag cushion.

29. The airbag module of claim 26, wherein the means for releasing the connection between the airbag cushion and the airbag module housing comprises means for releasing the connection between the flaps and the airbag module housing.

30. The airbag module of claim 29, wherein the means for releasing the connection between the flaps and the airbag module housing comprises a hook-and-loop fastener material.

31. An airbag module, comprising:
   an airbag module housing;
   an airbag cushion condensed into a compact configuration within the airbag module housing;
   a first flap that comprises fabric material and is connected with the airbag cushion and connected with the airbag module housing;
   a second flap that comprises fabric material and is connected with the airbag cushion and connected with the airbag module housing; and
   a third flap that comprises fabric material and is connected with the airbag cushion and connected with the airbag module housing, wherein the second flap is sandwiched between the first and third flaps and the second flap extends in at least approximately the opposite direction as the first and third flaps such that the first and third flaps are connected with the airbag module housing at an opposite portion of the airbag module housing with respect to the second flap.

32. An airbag module, comprising:
   an airbag module housing defining an opening and having a portion opposite the opening;
   an airbag cushion condensed into a compact configuration within the airbag module housing, wherein the airbag cushion is configured to be deployed through the opening defined by the housing; and
   a flap attached to the airbag cushion and connected with the airbag module housing, wherein the flap is positioned and configured to secure the airbag cushion in its compact configuration and against an interior surface of the airbag module housing such that at least a portion of the airbag is positioned between a portion of the flap that faces the airbag and the portion of the housing that is opposite the opening.

33. The airbag module of claim 32, further comprising a second flap attached to the airbag cushion and connected with the airbag module housing, wherein the first flap extends adjacent to the second flap and in at least approximately the opposite direction as the second flap such that the first and second flaps are connected with the airbag module housing at opposite portions of the airbag module housing.

34. The airbag module of claim 33, wherein the first and second flaps each comprise tear seams designed to be torn upon inflation of the airbag cushion.

35. The airbag module of claim 33, wherein the first and second flaps are each releasably connected with the airbag module housing.

36. The airbag module of claim 33, further comprising a third flap attached to the airbag cushion and connected with the airbag module housing.

37. The airbag module of claim 36, wherein the third flap extends adjacent to the second flap and in at least approximately the opposite direction as the second flap such that the second flap is sandwiched between the first and third flaps, and such that the second and third flaps are connected with the airbag module housing at opposite portions of the airbag module housing.

38. The airbag module of claim 37, wherein the first and third flaps are integrally connected with one another along a base portion such that the first flap, base portion, and third flap together form a U-shaped member.

39. The airbag module of claim 38, wherein the second flap is integrally connected with a base portion such that the second flap and the second flap base portion together form a T-shaped member, and wherein the T-shaped member and the U-shaped member overlap.

40. The airbag module of claim 32, wherein the flap is releasably connected with the airbag module housing.

* * * * *